(12) United States Patent
Naito

(10) Patent No.: US 8,625,929 B2
(45) Date of Patent: Jan. 7, 2014

(54) IMAGE PROCESSING APPARATUS AND STORAGE MEDIUM

(75) Inventor: Yukihiro Naito, Hachioji (JP)

(73) Assignee: Olympus Corporation, Tokyo (JP)

(*) Notice: Subject to any disclaimer, the term of this patent is extended or adjusted under 35 U.S.C. 154(b) by 132 days.

(21) Appl. No.: 13/231,268

(22) Filed: Sep. 13, 2011

(65) Prior Publication Data
US 2012/0070100 A1  Mar. 22, 2012

(30) Foreign Application Priority Data

Sep. 21, 2010 (JP) .................................. 2010-210959

(51) Int. Cl.
*G06K 9/40* (2006.01)
(52) U.S. Cl.
USPC ......................................................... 382/284
(58) Field of Classification Search
None
See application file for complete search history.

(56) References Cited

U.S. PATENT DOCUMENTS

| 7,876,320 B2 * | 1/2011 | Marugame ................... 345/420 |
| 2010/0149384 A1 * | 6/2010 | Iijima et al. .................. 348/241 |
| 2010/0157072 A1 * | 6/2010 | Luo et al. ................... 348/208.4 |

FOREIGN PATENT DOCUMENTS

| JP | 09-261526 | 10/1997 |
| JP | 2002-290817 | 10/2002 |
| JP | 2008-099260 | 4/2008 |
| JP | 2009-194700 | 8/2009 |

* cited by examiner

*Primary Examiner* — Stephen R Koziol
*Assistant Examiner* — Amandeep Saini
(74) *Attorney, Agent, or Firm* — Scully, Scott, Murphy & Presser, P.C.

(57) ABSTRACT

An image processing apparatus includes a first synthesizing unit that determines a first synthesis ratio of a plurality of images based on correlation amounts between a reference image and the plurality of images excluding the reference image and synthesizes a first image from a plurality of images based on the first synthesis ratio, a noise reducing unit that reduces noise of a plurality of images including the first image using a plurality of parameters and generates a plurality of noise-reduced first images including at least an image obtained by reducing noise of the first image, and a second synthesizing unit that determines a second synthesis ratio according to the first synthesis ratio and synthesizes a second image from the plurality of noise-reduced images based on the second synthesis ratio.

9 Claims, 15 Drawing Sheets

| | IMAGE 1 (REFERENCE IMAGE) | IMAGE 2 | IMAGE 3 | IMAGE 4 | SYNTHESIS RATIO INFORMATION |
|---|---|---|---|---|---|
| SYNTHESIS RATIO AT PIXEL A | 0.25 | 0.25 | 0.25 | 0.25 | 0.75 |
| SYNTHESIS RATIO AT PIXEL B | 0.60 | 0.20 | 0.20 | 0.00 | 0.40 |
| SYNTHESIS RATIO AT PIXEL C | 1.00 | 0.00 | 0.00 | 0.00 | 0.00 |

FIG.13

IMAGE PROCESSING APPARATUS AND STORAGE MEDIUM

FIELD OF THE INVENTION

The present invention relates to an image processing apparatus and a storage medium.

BACKGROUND OF THE INVENTION

To obtain an image with less noise upon picking up a still image in an image pickup apparatus such as a digital camera, it is effective to ensure a sufficient exposure time. However, if the exposure time is extended, there is a problem of blurring an image and making a picked-up image unclear due to a movement of a camera by a camera shake and due to a movement of an object.

An electronic blur correction method has been proposed as a method for dealing with such a blur. For example, JP9-261526A discloses a method for obtaining a good blur-free image by performing a synthesizing process after successively performing an image pickup operation in a short exposure time to cause a little blur a plurality of times and performing a position adjustment process so that motions between a plurality of obtained images are canceled.

If a synthesizing process is performed in a region where a position adjustment process failed, there is a problem of image blurring or double image. For this problem, a method in which a difference value between corresponding pixels is calculated before an addition process (averaging process) by a synthesizing process and a position adjustment process is judged to have failed and the synthesizing process is not performed when the difference value exceeds a threshold is proposed in JP2002-290817A.

Similarly, a method for suppressing the occurrence of a blur and a double image by adjusting a weight of a weighted averaging process in a synthesizing process based on a difference value between corresponding pixels is proposed in JP2008-99260A. By adjusting a synthesis weight by pixel in this way, it is possible to suppress the occurrence of a problem in a region where a position adjustment failed (pixel selection process).

However, an SN improvement effect by synthesis varies by pixel in these methods, with the result that an image with varying noise is generated (noise nonuniformity).

A method for dealing with this problem is proposed in JP2009-194700A. The method disclosed in JP2009-194700A is described with reference to FIG. 15.

An image is picked up by an image pickup device 801 through an optical system 800 constructed by a lens or the like and stored in a frame memory 802. By repeating the above image pickup process a specified number of times, a plurality of images are stored in the frame memory 802. A motion information acquiring unit 803 detects motion vectors between the plurality of images stored in the frame memory 802 and outputs the motion vectors as motion information to a synthesizing unit 804. The synthesizing unit 804 additively synthesizes the plurality of images stored in the frame memory 802 after adjusting the positions thereof using the motion information. In the additive synthesis, a process is performed to exclude pixels unsuitable for synthesis and outputs the process result as synthesis number information together with a synthesized image. A parameter control unit 805 outputs a noise reduction parameter at each pixel to a noise reducing unit 806, considering required noise reduction strength at each pixel from the synthesis number information. The noise reducing unit 806 performs a noise reduction process on each pixel with the noise reduction parameter designated by the parameter control unit 805 for the input synthesized image and outputs the resultant to an image processing unit 807. The image processing unit 807 generates an output image by performing necessary image processings such as a color processing and a gradation conversion processing. By changing the noise reduction strength by pixel according to a variation of a synthesis number in this way, it becomes possible to synthesize images while suppressing the occurrence of noise nonuniformity.

SUMMARY OF THE INVENTION

One aspect of the present invention is directed to an image processing apparatus for synthesizing a plurality of images. The image processing apparatus includes a first synthesizing unit that determines one out of a plurality of images as a reference image, determines a first synthesis ratio based on correlation amounts between the reference image and the plurality of images excluding the reference image and synthesizes a first image from the plurality of images based on the first synthesis ratio, a noise reducing unit that reduces noise of at least the first image using a plurality of parameters and generates a plurality of noise-reduced images including at least a noise-reduced first image obtained as a result of reducing noise of the first image, and a second synthesizing unit that determines a second synthesis ratio according to the first synthesis ratio and synthesizes a second image from the plurality of noise-reduced images based on the second synthesis ratio.

Another aspect of the present invention is directed to a non-temporary computer-readable storage medium storing an image processing program for processing picked-up images by a computer. The image processing program causes the computer to perform a first synthesizing procedure for determining one out of a plurality of images as a reference image, determining a first synthesis ratio based on correlation amounts between the reference image and the plurality of images excluding the reference image and synthesizing a first image from the plurality of images based on the first synthesis ratio, a noise reducing procedure for reducing noise of at least the first image using a plurality of parameters and generating a plurality of noise-reduced images including at least a noise-reduced first image obtained as a result of reducing noise of the first image, and a second synthesizing procedure for determining a second synthesis ratio according to the first synthesis ratio and synthesizing a second image from the plurality of noise-reduced images based on the second synthesis ratio.

BRIEF DESCRIPTION OF THE DRAWINGS

FIG. 13 is a table showing synthesis ratio information of the fourth embodiment.

DESCRIPTION OF PREFERRED EMBODIMENTS

Figure 1:
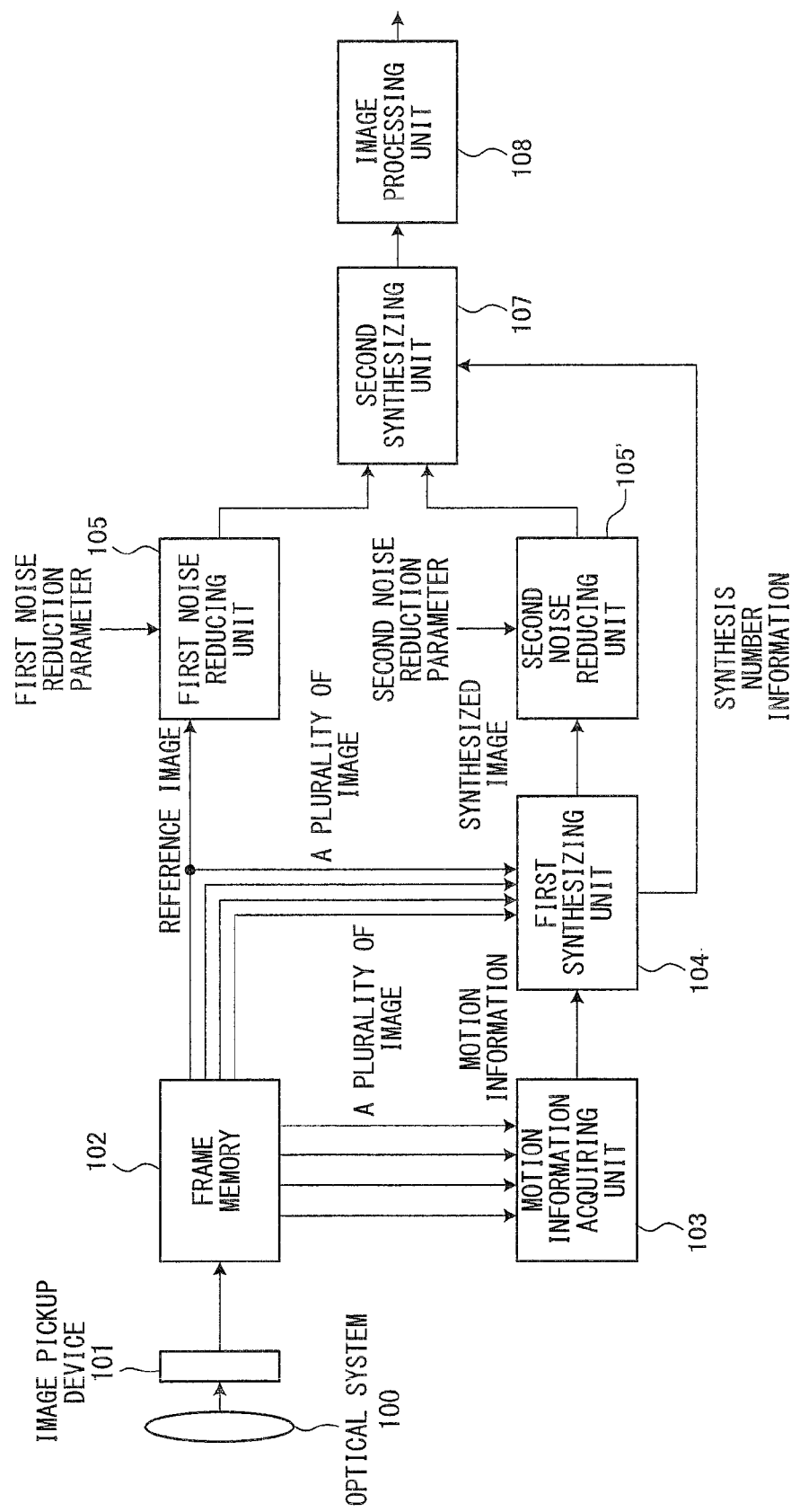
FIG. 1 is a schematic construction diagram of an image processing apparatus according to a first embodiment of the present invention.

An image processing apparatus according to a first embodiment of the present invention is described with reference to FIG. 1. FIG. 1 is a schematic construction diagram of the image processing apparatus of this embodiment.

The image processing apparatus of this embodiment includes an optical system 100, an image pickup device 101, a frame memory 102, a motion information acquiring unit 103, a first synthesizing unit 104, a first noise reducing unit 105, a second noise reducing unit 105', a second synthesizing unit 107 and an image processing unit 108.

The image pickup device 101 outputs an electrical signal corresponding to light incident on a light receiving surface via the optical system 100 constructed by a lens or the like at a predetermined timing. This electrical signal is stored as image data in the frame memory 102. By repeating such an image pickup process a specified number of times, a plurality of image data are stored in the frame memory 102. Image data is merely treated as an image below.

The motion information acquiring unit 103 detects motion vectors between a plurality of images stored in the frame memory 102 and output the motion vectors as motion information to the first synthesizing unit 104. In this embodiment, the motion information acquiring unit 103 selects a reference image out of a plurality of images and detects motion vectors between the reference image and the other images.

After adjusting the positions of the plurality of images stored in the frame memory 102 using the motion information for additive synthesis, the first synthesizing unit 104 normalizes an additive synthesis result according to the number of the added images and outputs the resultant as a synthesized image.

The first synthesizing unit 104 performs a pixel selection process for determining not to use pixels of the other image for synthesis when the absolute value of a difference between a pixel of the reference image and that of the other image is larger than a predetermined value (i.e. when a correlation amount between the pixel of the reference image and that of the other image is small) in additive synthesis. The first synthesizing unit 104 outputs the number of images synthesized by the first synthesizing unit 104 at each pixel position of the synthesized image as synthesis number information (first synthesis ratio) to the second synthesizing unit 107.

The first noise reducing unit 105 performs a noise reduction process on the reference image based on a first noise reduction parameter (first parameter) and outputs the processed reference image to the second synthesizing unit 107. The first noise reduction parameter is a parameter adjusted in advance on the premise of being applied to one reference image, and selected according to the conditions (ISO sensitivity, etc.) at the time of an image pickup process.

The second noise reducing unit 105' performs a noise reduction process on the synthesized image output by the first synthesizing unit 104 based on a second noise reduction parameter (second parameter) and outputs the processed synthesized image to the second synthesizing unit 107. The second noise reduction parameter is a parameter adjusted in advance on the premise that a plurality of images are noise-reduced by being synthesized in the first synthesizing unit 104, and selected according to the conditions (ISO sensitivity, etc.) at the time of an image pickup operation similar to the first noise reduction parameter. Since a noise reduction effect by synthesizing the plurality of images in the first synthesizing unit 104 can be expected, the second noise reduction parameter is a parameter having weaker noise reduction strength than the first noise reduction parameter. Typically, the second noise reduction parameter is set assuming a reduction in noise amount when all the images are synthesized without the pixel selection process being performed in the first synthesizing unit 104. For example, in the case of synthesis based on four images, the second noise reduction parameter is set assuming a reduction in noise amount when the absolute values of differences between a pixel of a reference image and those of the other three images are respectively equal to or smaller than the predetermined value and an image is synthesized using all the four images.

The first noise reducing unit 105 and the second noise reducing unit 105' may be general-purpose noise reducing units. Further, these units need not necessarily perform the same process, but it is preferable to suppress an apparatus size by a technique such as the one for causing these units to perform the same process and using the same process block in a time division manner.

Figure 2:
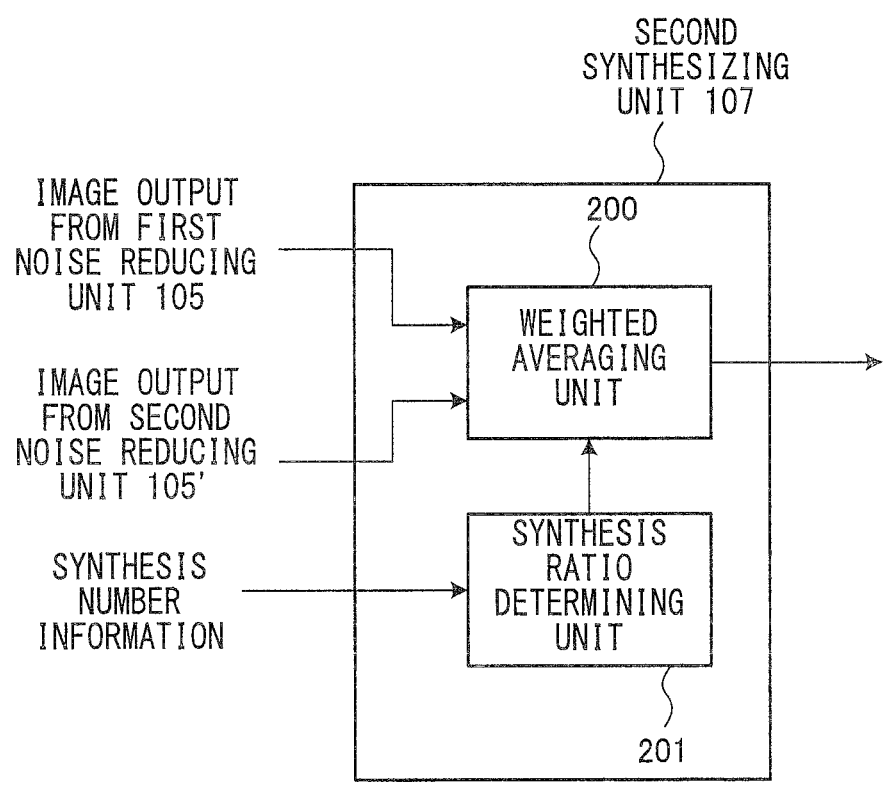
FIG. 2 is a schematic construction diagram of a second synthesizing unit of the first embodiment.

Next, the construction of the second synthesizing unit 107 is shown in FIG. 2.

The second synthesizing unit 107 includes a weighted averaging unit 200 and a synthesis ratio determining unit 201. The second synthesizing unit 107 further synthesizes an image from the image output from the noise reducing unit 105 and that output from the second noise reducing unit 105' based on the synthesis number information.

Figure 3A:
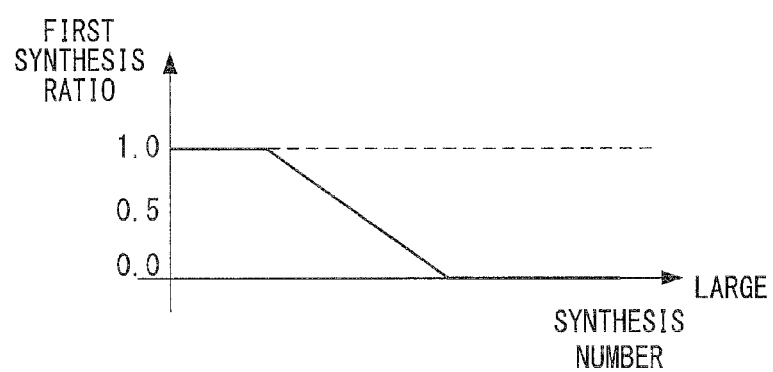
FIG. 3A is a graph showing a method for calculating a first synthesis ratio of the first embodiment.
Figure 3B:
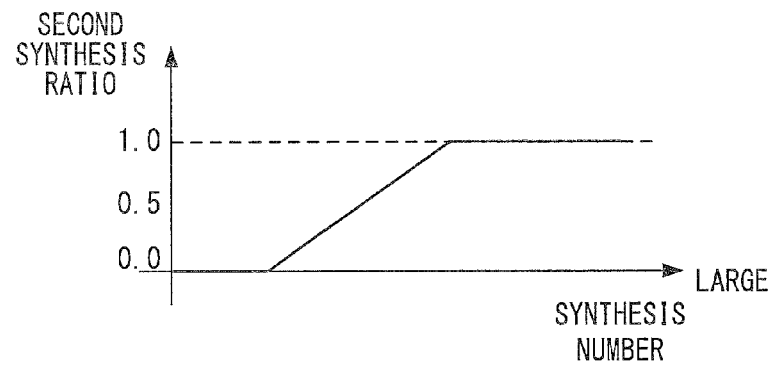
FIG. 3B is a graph showing a method for calculating a second synthesis ratio of the first embodiment.

The synthesis ratio determining unit 201 determines a synthesis ratio (second synthesis ratio) of two output images from the synthesis number information. FIGS. 3A, 3B show examples of the synthesis ratio. A first synthesis ratio in FIG. 3A is a synthesis ratio of the output image output from the first noise reducing unit 105, and a second synthesis ratio in FIG. 3B is a synthesis ratio of the output image output from the second noise reducing unit 105'. The synthesis ratio determining unit 201 maintains relationships as shown in FIGS. 3A and 3B set beforehand by a technique such as broken line approximation or tabulation. In the examples shown in FIGS. 3A and 3B, the synthesis ratio determining unit 201 outputs a value close to 1.0 as the first synthesis ratio and a value close to 0.0 as the second synthesis ratio at a pixel where the synthesis number is small so that the synthesis ratio of the output image output from the first noise reducing unit 105 (image obtained by performing the noise reduction process on the reference image with a strong noise reduction parameter) is relatively higher.

On the other hand, at a pixel where the synthesis number is large, the synthesis ratio determining unit 201 outputs a value close to 0.0 as the first synthesis ratio and a value close to 1.0 as the second synthesis ratio so that the synthesis ratio of the output image output from the second noise reducing unit 105' (image obtained by performing the noise reduction process on the synthesized image generated by the first synthesizing unit 104 with the second noise reduction parameter which is a weak noise reduction parameter) is relatively higher.

In this way, the smaller the synthesis number, the higher the ratio of the noise-reduced reference image in the synthesis ratio determined in the synthesis ratio determining unit 201. That is, the higher the ratio of the reference image in the image synthesized in the first synthesizing unit 104, the higher the ratio of the noise-reduced reference image in the image to be synthesized in the second synthesizing unit 107.

Based on these synthesis ratios, the weighted averaging unit 200 performs a weighted averaging process on the two output images. As a result, a relatively weak noise reduction process is applied to pixels in a region where a position adjustment can be performed without any problem in the first synthesizing unit 104 and the synthesis number is large.

On the other hand, a relatively strong noise reduction process is applied to pixels in a region where the synthesis number is small due to a failure in the position adjustment in the first synthesizing unit 104.

Necessary image processing such as a color processing and a gradation conversion processing are performed on the image output from the second synthesizing unit 107 in the image processing unit 108.

Effects of the first embodiment of the present invention are described.

It becomes possible to synthesize images while suppressing the occurrence of noise nonuniformity by changing the noise reduction strength by pixel according to a variation of the synthesis number as in this embodiment. The strengths of the noise reduction parameters (first noise reduction parameter, second noise reduction parameter) used at this time need not be controlled by pixel according to the synthesis number and the same noise reduction parameters can be used at each pixel. Thus, general-purpose noise reduction parameters can be used and a special modification for the noise reduction process is not necessary. As a result, an effect of improving image quality by adopting the general-purpose high-performance noise reduction process and an effect of facilitating the apparatus design by adopting the existing pre-designed noise reduction process can be obtained.

In this embodiment, the positions of the images are adjusted by the motion information acquiring unit 103. However, if the frame rate at the time of the image pickup operation is sufficiently high, it is also possible to omit the position adjustment process since amounts of change between images are small.

Figure 4:
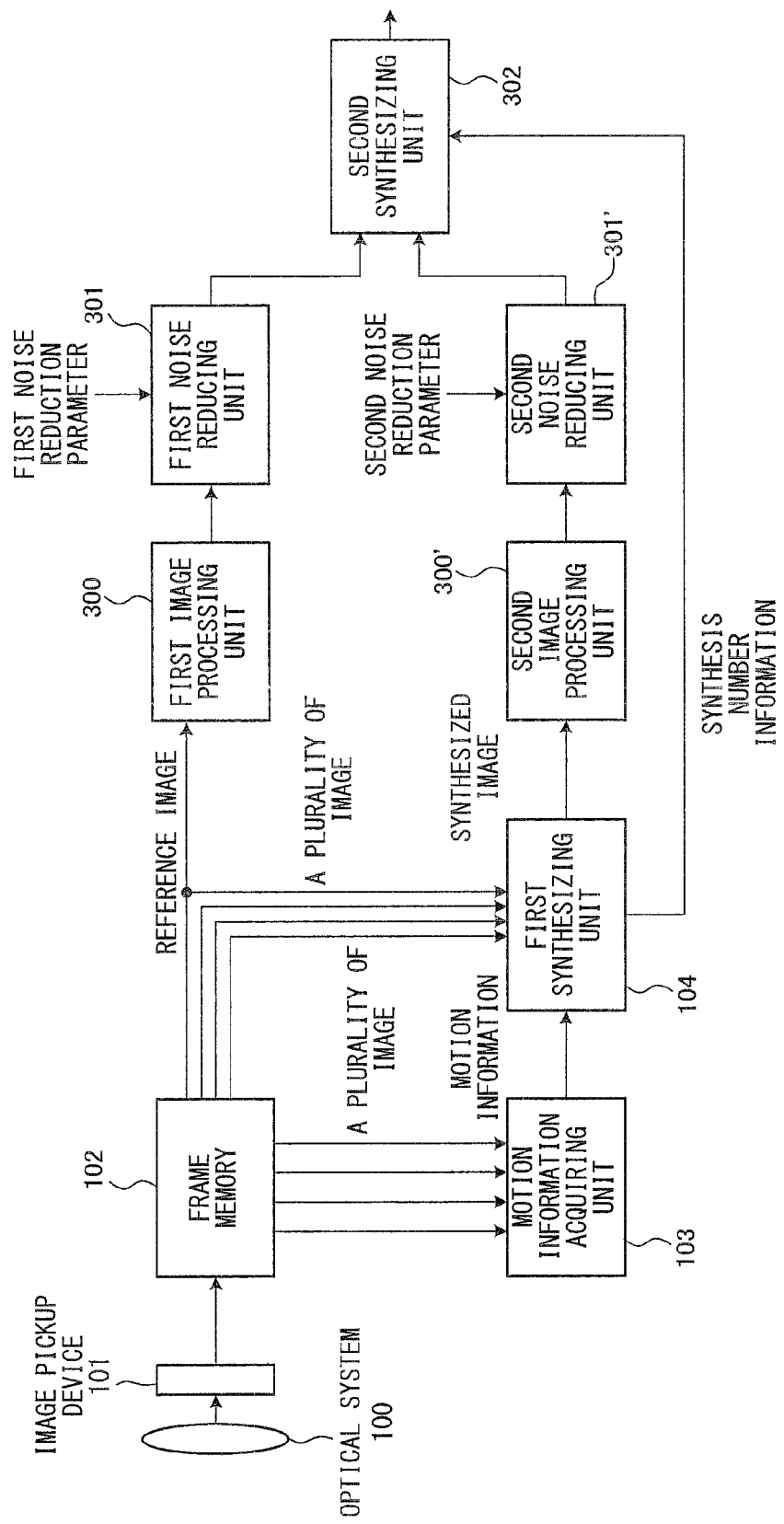
FIG. 4 is a diagram showing a modification of the first embodiment.

In the construction shown in FIG. 1, an image picked up by the image pickup device 101 is input to the image processing unit 108 after noise reduction in the first noise reducing unit 105 and the second noise reducing unit 105'. Thus, if the image pickup device 101 is a single-plate image pickup device such as the one with a Bayer array, the noise reduction process also needs to be a process compatible with the single-plate image pickup device. If a noise reduction process desired to be adopted is a process compatible only with an RGB or YCbCr type image pickup device composed of three two-dimensional CCD device(3CCD), the image processing apparatus may be constructed as shown in FIG. 4. In the construction shown in FIG. 4, a single image picked up by an image pickup device 101 is noise-reduced in a first noise reducing unit 301 and a second noise reducing unit 301' after being converted into 3CCD images in image processings in a first image processing unit 300 and a second image processing unit 300'. Then, an image is synthesized based on synthesis number information in a second synthesizing unit 302.

Figure 5:
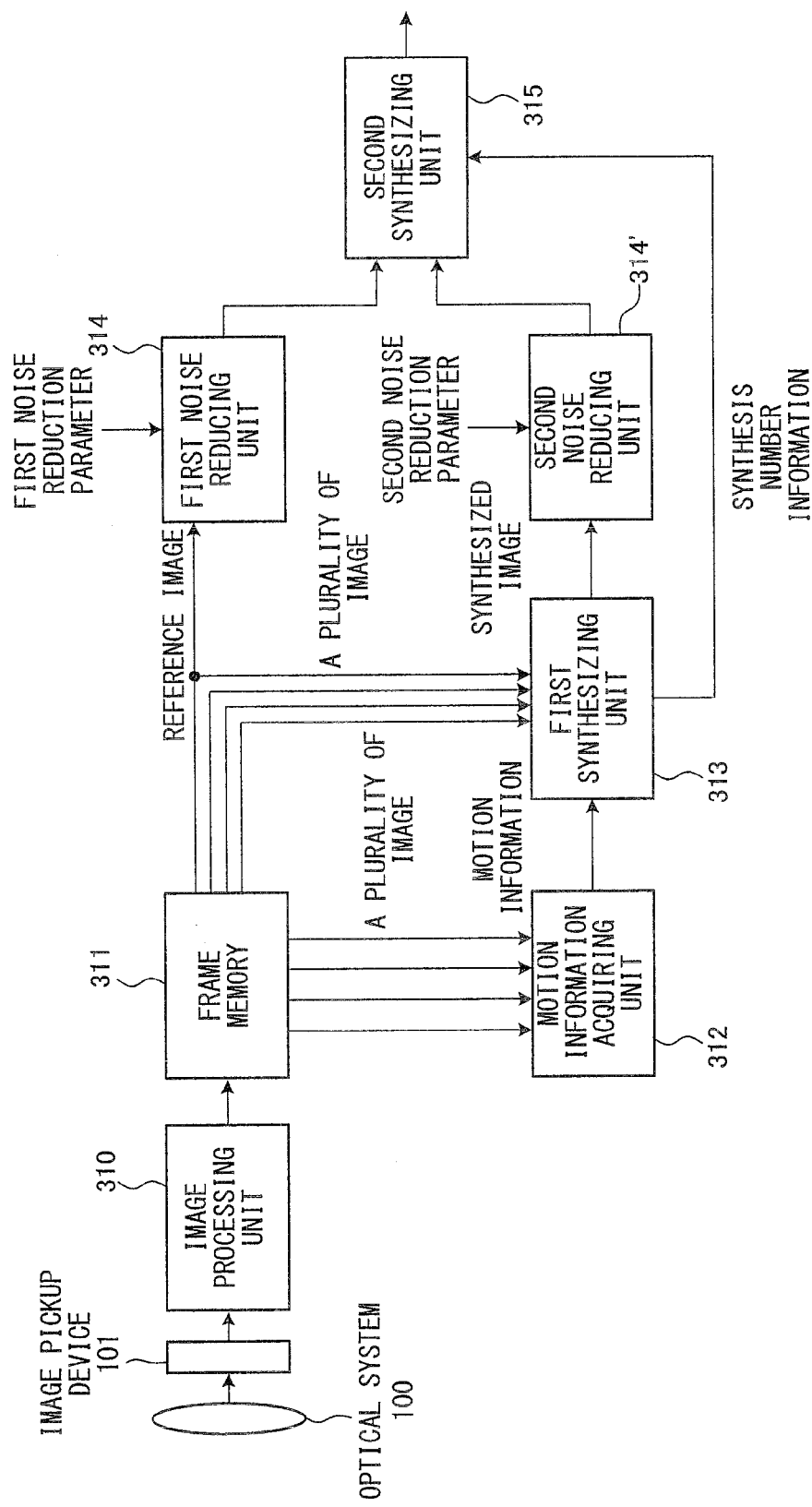
FIG. 5 is a diagram showing a modification of the first embodiment.

The image processing apparatus may also be constructed as shown in FIG. 5. In the construction shown in FIG. 5, all images picked up by an image pickup device 101 are stored in a frame memory 311 after each of them is converted into 3CCD images in an image processing unit 310. Then, a position adjustment process in a motion information acquiring unit 312 and a first synthesizing unit 313, a noise reducing process in a first noise reducing unit 314 and a second noise reduction unit 314' and a synthesizing process in a second synthesizing unit 315 are applied to the 3CCD converted images.

Figure 6:
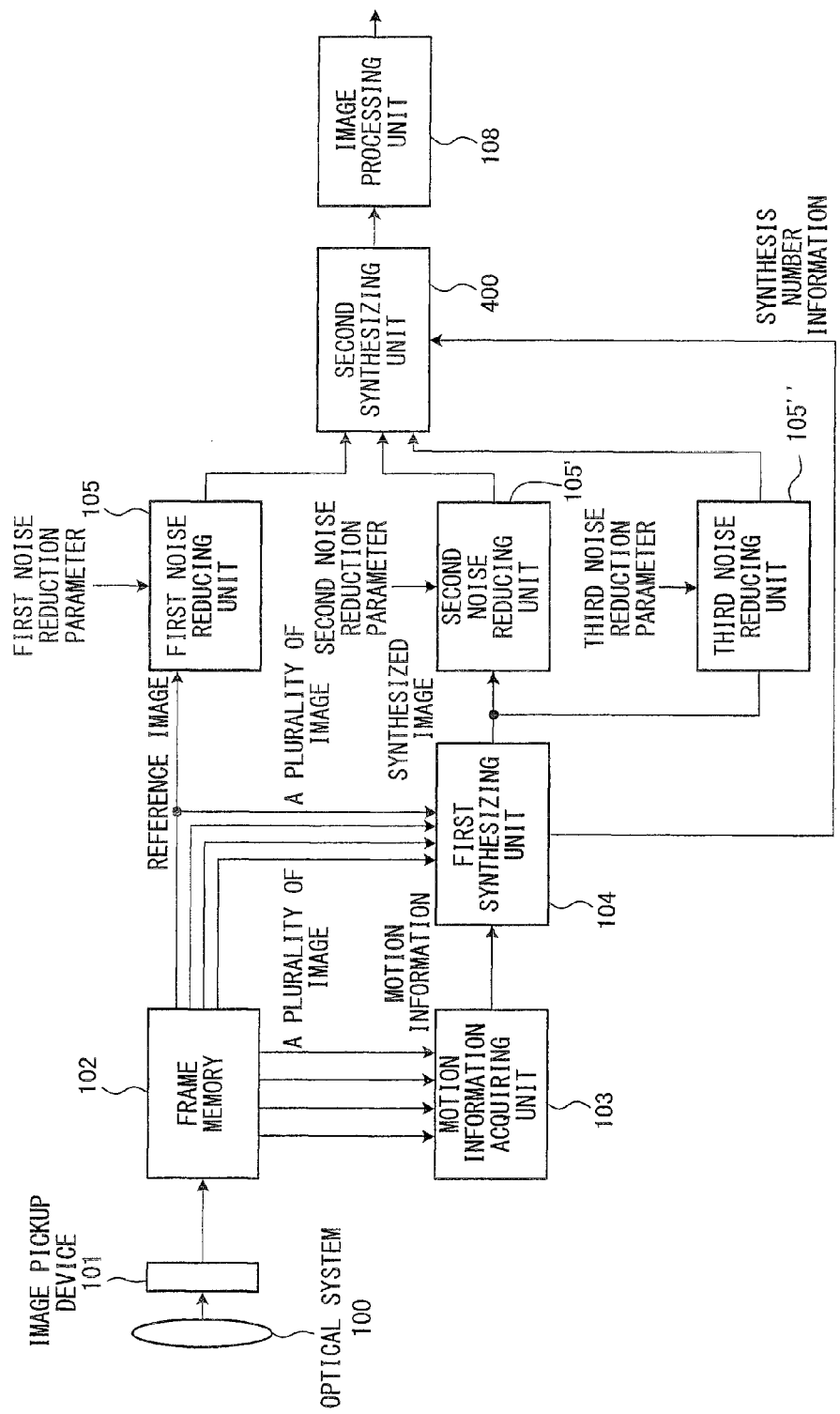
FIG. 6 is a schematic construction diagram of an image processing apparatus according to a second embodiment of the present invention.

Next, a second embodiment of the present invention is described with reference to FIG. 6. FIG. 6 is a schematic construction diagram of an image pickup apparatus according to this embodiment.

In the first embodiment, the noise reduction process corresponding to a variation of the synthesis number is realized using two kinds of parameters having different noise reduction strengths (first noise reduction parameter and second noise reduction parameter). The second embodiment aims to realize a finer control by increasing the number of the kinds of parameters to three. Parts different from the first embodiment are described below.

The image pickup apparatus of this embodiment includes a third noise reducing unit 105" in addition to a first noise reducing unit 105 and a second noise reducing unit 105'.

The third noise reducing unit 105" performs a noise reduction process to a synthesized image output by a first synthesizing unit 104 based on a third noise reduction parameter similar to the second noise reducing unit 105' and outputs the processed image to a second synthesizing unit 400. The third noise reduction parameter is a parameter having noise reduction strength weaker than that of a first noise reduction parameter and stronger than that of the second noise reduction parameter.

Typically, the first noise reduction parameter is a parameter adjusted in advance on the premise of being applied to one reference image and the second noise reduction parameter is a parameter set to be weak assuming a reduction in noise amount when all images are synthesized without a pixel selection process being performed in the first synthesizing unit 104. The third noise reduction parameter is a parameter having intermediate noise reduction strength between the first noise reduction parameter and the second noise reduction parameter.

Figure 7:
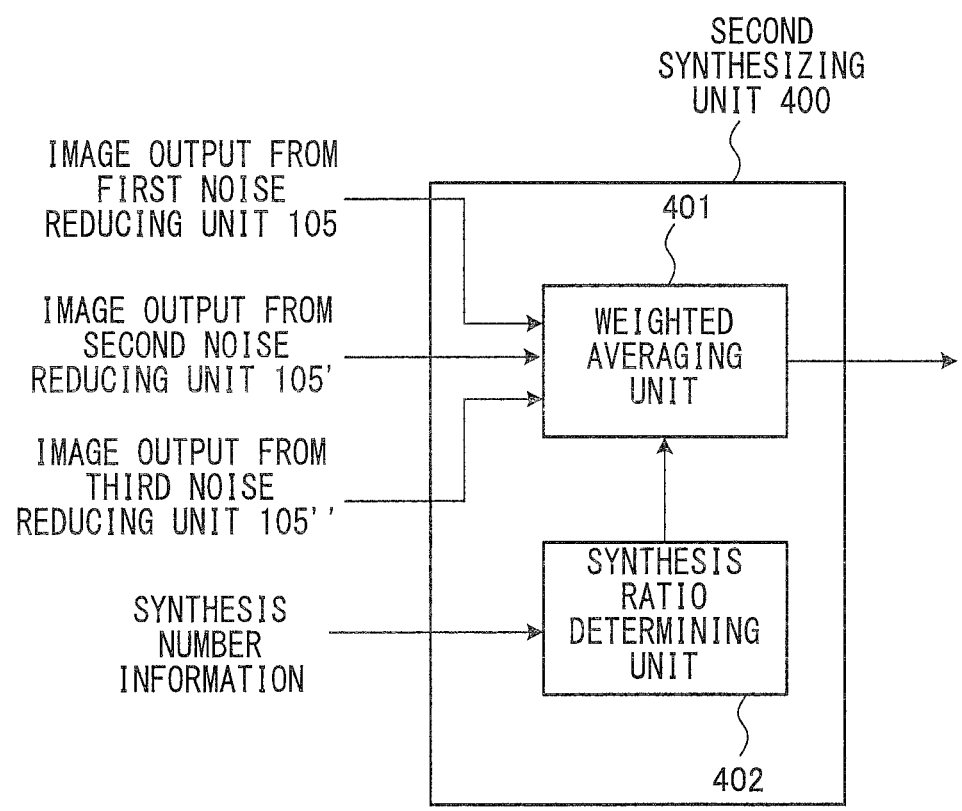
FIG. 7 is a schematic construction diagram of a second synthesizing unit of the second embodiment.

FIG. 7 shows the construction of the second synthesizing unit 400.

The second synthesizing unit 400 further synthesizes an image from images output from the first noise reducing unit 105, the second noise reducing unit 105' and the third noise reducing unit 105" based on synthesis number information output from the first synthesizing unit 104.

Figure 8A:
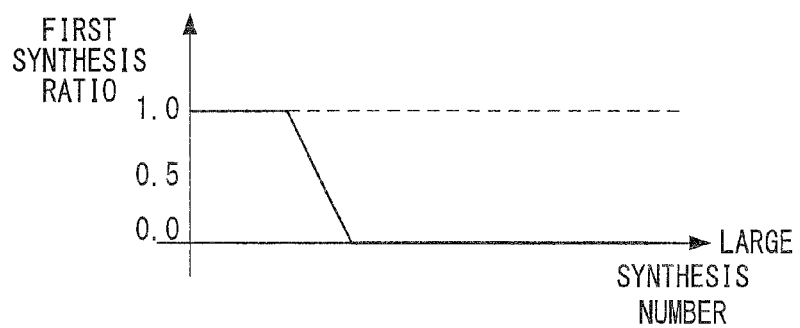
FIG. 8A is a graph showing a method for calculating a first synthesis ratio of the second embodiment.
Figure 8B:
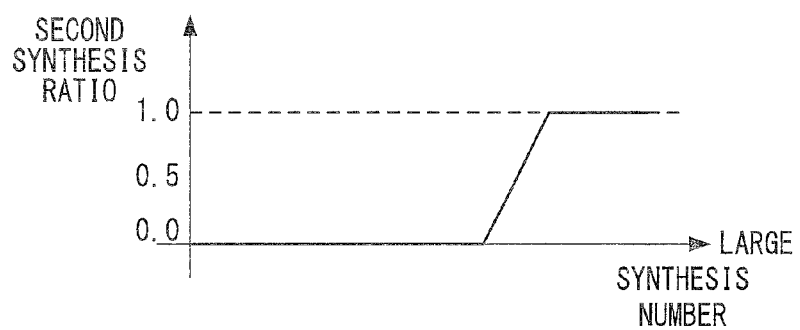
FIG. 8B is a graph showing a method for calculating a second synthesis ratio of the second embodiment.
Figure 8C:
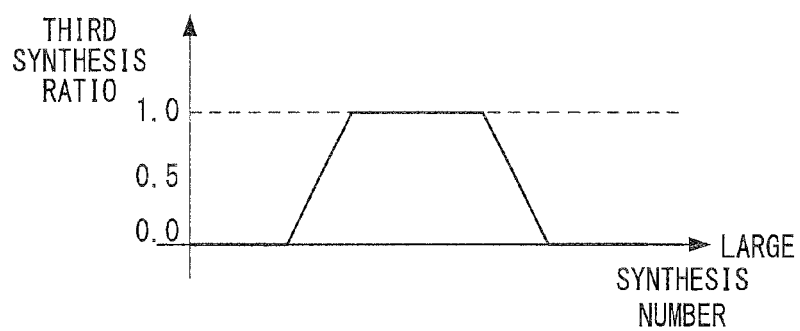
FIG. 8C is a graph showing a method for calculating a third synthesis ratio of the second embodiment.

A synthesis ratio determining unit 402 determines synthesis ratios of the three output images from the synthesis number information. FIGS. 8A, 8B and 8C show examples of the synthesis ratio. A first synthesis ratio in FIG. 8A is a synthesis ratio of the image output from the first noise reducing unit 105, a second synthesis ratio in FIG. 8B is a synthesis ratio of the image output from the second noise reducing unit 105' and a third synthesis ratio in FIG. 8C is a synthesis ratio of the image output from the third noise reducing unit 105". The synthesis ratio determining unit 402 maintains relationships as shown in FIGS. 8A, 8B and 8C set beforehand by a technique such as broken line approximation or tabulation.

In the examples shown in FIGS. 8A, 8B and 8C, a value close to 1.0 is output as the first synthesis ratio and values close to 0.0 are output as the second synthesis ratio and the third synthesis ratio at a pixel where the synthesis number is small so that the synthesis ratio of the image output from the first noise reducing unit 105 (image obtained by performing the noise reduction process on a reference image with a strong noise reduction parameter) is relatively higher.

On the other hand, at a pixel where the synthesis number is large, a value close to 1.0 is output as the second synthesis ratio and values close to 0.0 are output as the first synthesis ratio and the third synthesis ratio so that the synthesis ratio of the image output from the second noise reducing unit 105' (image obtained by performing the noise reduction process on the synthesized image generated by the first synthesizing unit 104 with a weak noise reduction parameter) is relatively higher.

In the case of the intermediate synthesis number, the third synthesis ratio is set at a value close to 1.0 and the first synthesis ratio and the second synthesis ratio are set at values close to 0.0 so as to exhibit an intermediate property.

A weighted averaging unit 401 performs a weighted averaging process on the respective output images based on such synthesis ratios. As a result, a relatively weak noise reduction process is applied to pixels in a region where a position adjustment can be performed without any problem in the first synthesizing unit 104 and the synthesis number is large.

On the other hand, a relatively strong noise reduction process is applied to pixels in a region where the synthesis number is small due to a failure in the position adjustment in the first synthesizing unit 104.

In the case of the intermediate synthesis number, an intermediate property of these is exhibited.

Necessary image processing such as a color processing and a gradation conversion processing are performed on the image output from the second synthesizing unit 400 in an image processing unit 108.

Effects of the second embodiment of the present invention are described.

The control of the noise reduction strength in response to a variation of the synthesis number becomes finer by increasing the number of the kinds of the noise reduction parameters used from two to three as in this embodiment, and an effect of further improving image quality can be obtained in addition to the effects in the first embodiment.

Although two noise reducing units are used as the noise reducing units for reducing the noise of the synthesized image in the second embodiment, the number of the noise reducing units can be set at N (N is a natural number equal to or greater than 2) without being limited to this. It is possible to make the control finer and obtain an image with reduced noise by increasing the number of the noise reducing units.

Figure 9:
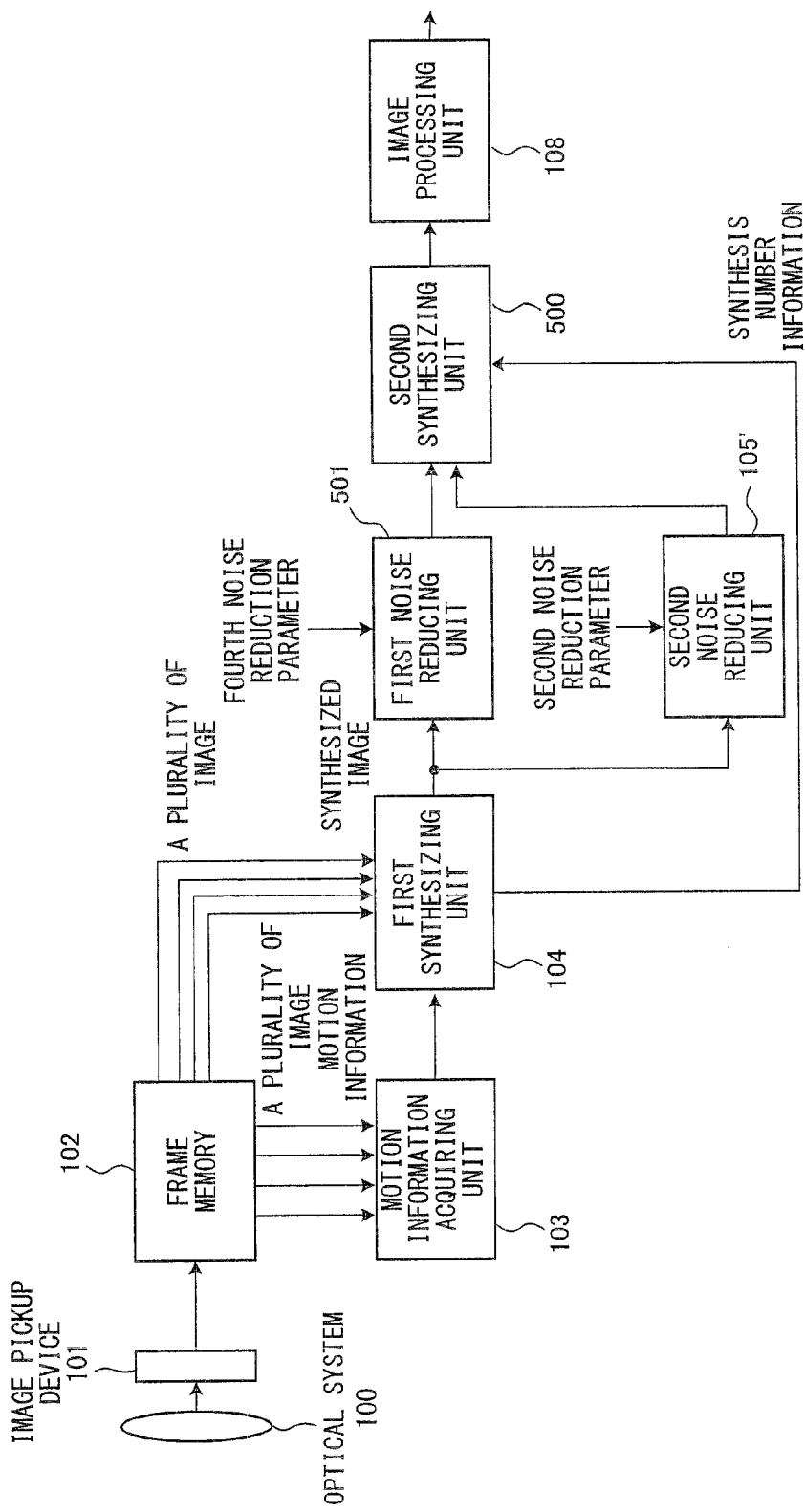
FIG. 9 is a schematic construction diagram of an image processing apparatus according to a third embodiment of the present invention.

Next, a third embodiment of the present invention is described with reference to FIG. 9. FIG. 9 is a schematic construction diagram of an image pickup apparatus according to this embodiment.

In the second embodiment, the noise reduction strength corresponding to a variation of the synthesis number is controlled by applying the first noise reduction parameter to the reference image and applying the second noise reduction parameter and the third noise reduction parameter to the synthesized images using the three kinds of parameters (first noise reduction parameter, second noise reduction parameter, third noise reduction parameter) having different noise reduction strengths. On the contrary, in the third embodiment, two kinds of noise reduction parameters are applied only to synthesized images. Parts different from the first and second embodiments are described below.

The image pickup apparatus of this embodiment includes a first noise reducing unit 501 and a second noise reducing units 105'.

A second synthesizing unit 500 further synthesizes an image from output images output from the first noise reducing unit 501 and the second noise reducing unit 105' based on synthesis number information output from a first synthesizing unit 104.

The first noise reducing unit 501 performs a noise reduction process on a synthesized image synthesized in the first synthesizing unit 104 based on a fourth noise reduction parameter and outputs the processed image to the second synthesizing unit 500. The fourth noise reduction parameter is a parameter for relatively strengthening noise reduction strength. The fourth noise reduction parameter is a parameter adjusted in advance on the premise of being applied to one reference image. Note that the fourth noise reduction parameter may be a parameter having noise reduction strength stronger than that of a second noise reduction parameter and weaker than a parameter adjusted on the premise of being applied to one reference image.

Figure 10:
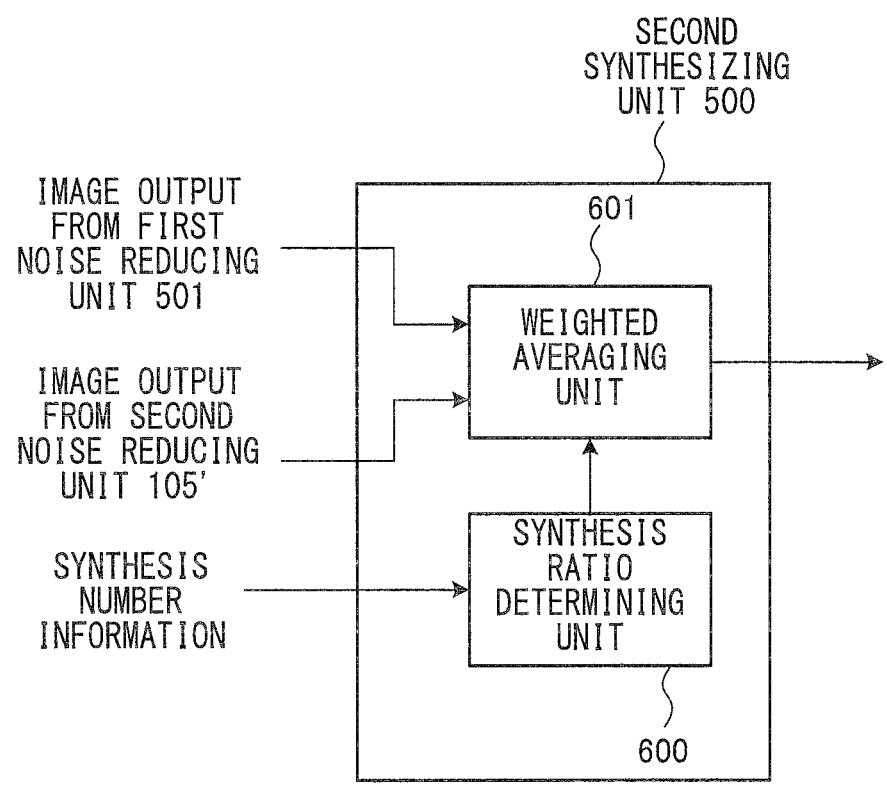
FIG. 10 is a schematic construction diagram of a second synthesizing unit of the third embodiment.

FIG. 10 shows the construction of the second synthesizing unit 500.

The second synthesizing unit 500 further synthesizes the image from images output from the first noise reducing unit 501 and the second noise reducing unit 105' based on the synthesis number information output from the first synthesizing unit 104.

Figure 11A:
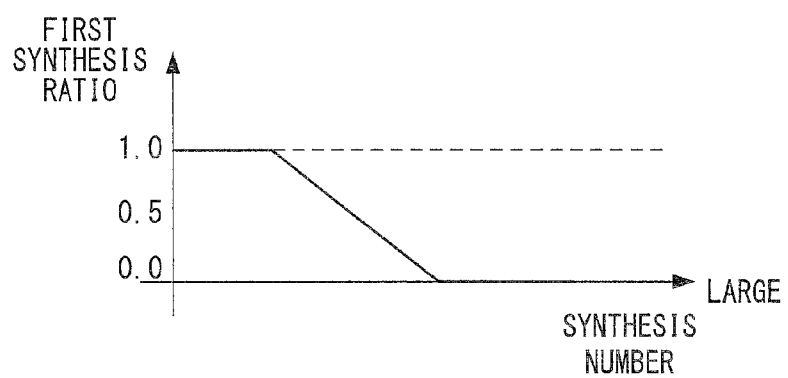
FIG. 11A is a graph showing a method for calculating a first synthesis ratio of the third embodiment.
Figure 11B:
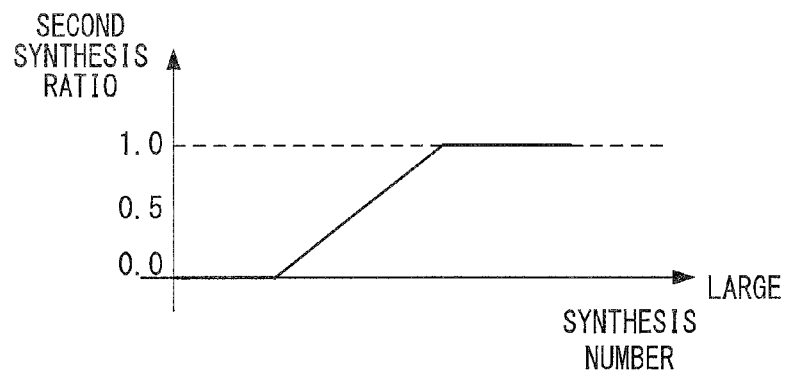
FIG. 11B is a graph showing a method for calculating a second synthesis ratio of the third embodiment.

A synthesis ratio determining unit 600 determines synthesis ratios of the two output images from the synthesis number information. FIGS. 11A and 11B show examples of the synthesis ratio. A first synthesis ratio in FIG. 11A is a synthesis ratio of the image output from the first noise reducing unit 501 and a second synthesis ratio in FIG. 11B is a synthesis ratio of the image output from the second noise reducing unit 105'. The synthesis ratio determining unit 600 maintains relationships as shown in FIGS. 11A and 11B set beforehand by a technique such as broken line approximation or tabulation.

In the examples shown in FIGS. 11A and 11B, a value close to 1.0 is output as the first synthesis ratio and a value close to 0.0 is output as the second synthesis ratio at a pixel where the synthesis number is small so that the synthesis ratio of the image output from the first noise reducing unit 501 (image obtained by performing a relatively strong noise reduction process on the synthesized image generated by the first synthesizing unit 104) is relatively higher.

On the other hand, at a pixel where the synthesis number is large, a value close to 1.0 is output as the second synthesis ratio and a value close to 0.0 is output as the first synthesis ratio so that the synthesis ratio of the image output from the second noise reducing unit 105' (image obtained by performing the noise reduction process on the synthesized image generated by the first synthesizing unit 104 with a weak noise reduction parameter) is relatively higher.

A weighted averaging unit 601 performs a weighted averaging process on the respective output images based on such synthesis ratios.

Necessary image processing such as a color processing and a gradation conversion processing are performed on the image output from the second synthesizing unit 500 in an image processing unit 108.

Effects of the third embodiment of the present invention are described.

Effects similar to those of the first and second embodiments can be obtained also by preparing a plurality of noise reduction parameters to be used and applying these only to synthesized images as in this embodiment. Further, since the noise reduction process is performed only on the synthesized images, an effect of simplifying a process construction can be obtained.

Although the noise reduction process is performed on the synthesized images using the two noise reducing units in the third embodiment, the number of the noise reducing units can be set at N (N is a natural number equal to or greater than 2) without being limited to this. It is possible to make the control finer and obtain an image with reduced noise by increasing the number of the noise reducing units.

Figure 12:
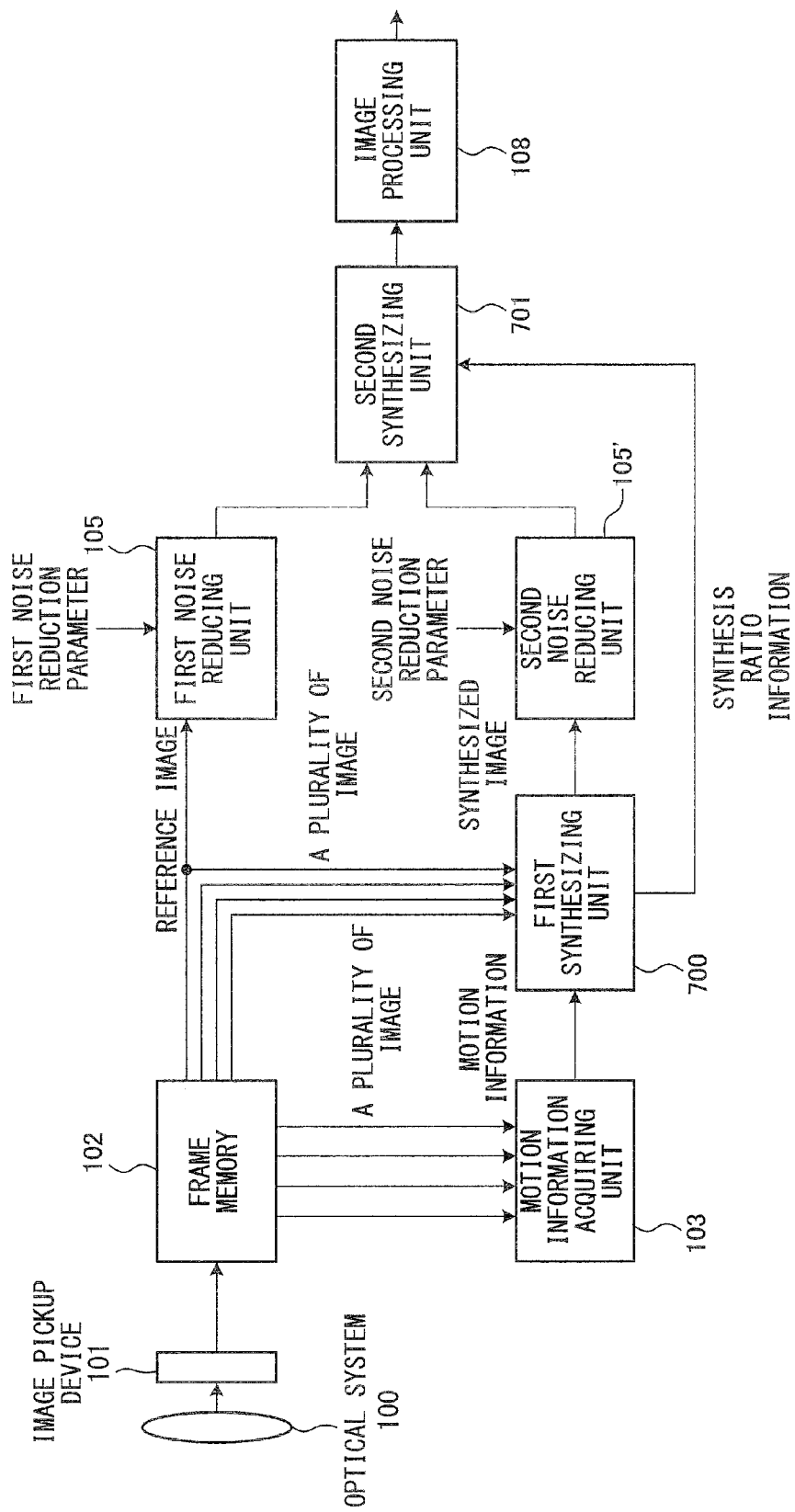
FIG. 12 is a schematic construction diagram of an image processing apparatus according to a fourth embodiment of the present invention.

Next, a fourth embodiment of the present invention is described with reference to FIG. 12. FIG. 12 is a schematic construction diagram of an image pickup apparatus according to this embodiment.

In the first to third embodiments, the pixel selection process performed in the first synthesizing unit 104 assumes the method proposed in JP2002-290817A and the like in which method selection is made as to whether or not to synthesize for each pixel of each image and, as a result, the first synthesizing unit 104 outputs the synthesis number information for each pixel of the synthesized image. In the case of this construction, there is no problem if the maximum number of images to be picked up is determined beforehand, but there is a problem of being unable to determine a bit width for storing the synthesis number information if the maximum number is not determined.

Further, there is also a problem that the construction shown in the first embodiment cannot be applied if the pixel selection process adopts the method disclosed in JP2008-99260A or the like in which method weighted average weights are adjusted.

Accordingly, in the fourth embodiment, a first synthesizing unit 700 outputs a cumulative value of weights of a plurality of images excluding a reference image as synthesis ratio information instead of the synthesis number information output by the first synthesizing unit 104 of the first embodiment. Parts different from the first embodiment are described below.

FIG. 13 shows a table showing the synthesis ratio information output by the first synthesizing unit 700. In this embodiment, it is assumed that four images (images 1 to 4) are picked up and synthesized and the image 1 is a reference image. Further, three pixels (pixels A to C) out of pixels of each image are described as an example. The weights (synthesis ratios) of the images are set beforehand according to a state of position adjustment and one example is shown in FIG. 13.

At a certain pixel A, it is not necessary to perform the pixel selection process and the pixels of the four images are synthesized at an equal ratio (0.25) since the position adjustment was successfully performed. The synthesis ratio information at this time is 0.75 which is a cumulative value of the synthesis ratios of the images 2 to 4 excluding the image 1 as the reference image.

At another pixel B, the synthesis ratios of the images 1 to 4 are values as shown in FIG. 13 if the position adjustment fails in the image 4. In this case, the synthesis ratio information is 0.4 which is a cumulative value of the synthesis ratios of the images 2 to 4.

At another pixel C, the synthesis ratios of the images 2 to 4 are all 0.0 as shown in FIG. 13 if all the position adjustments fail. In this case, the synthesis ratio information is 0.0.

Figure 14A:
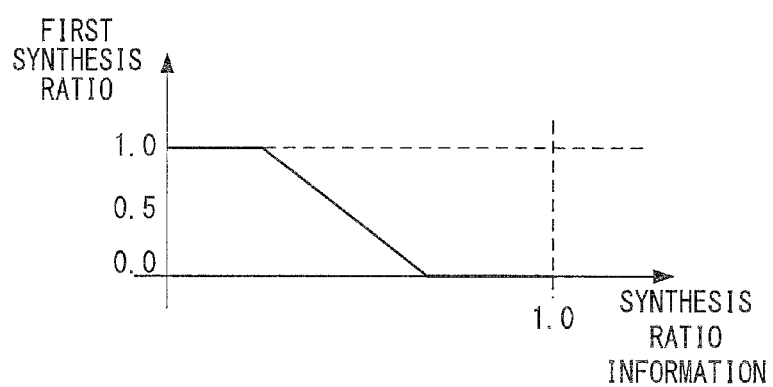
FIG. 14A is a graph showing a method for calculating a first synthesis ratio of the fourth embodiment.
Figure 14B:
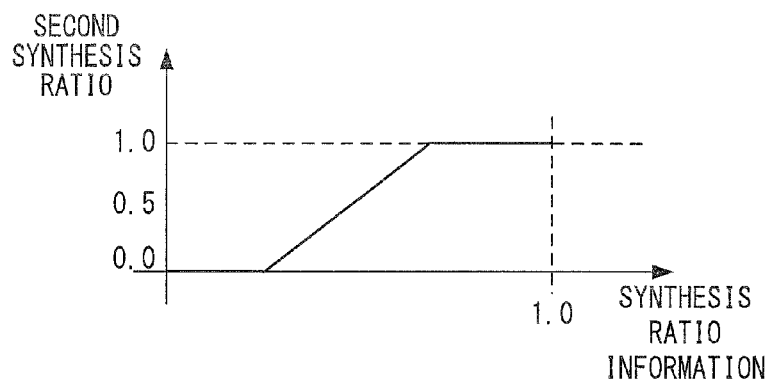
FIG. 14B is a graph showing a method for calculating a second synthesis ratio of the fourth embodiment.
Figure 15:
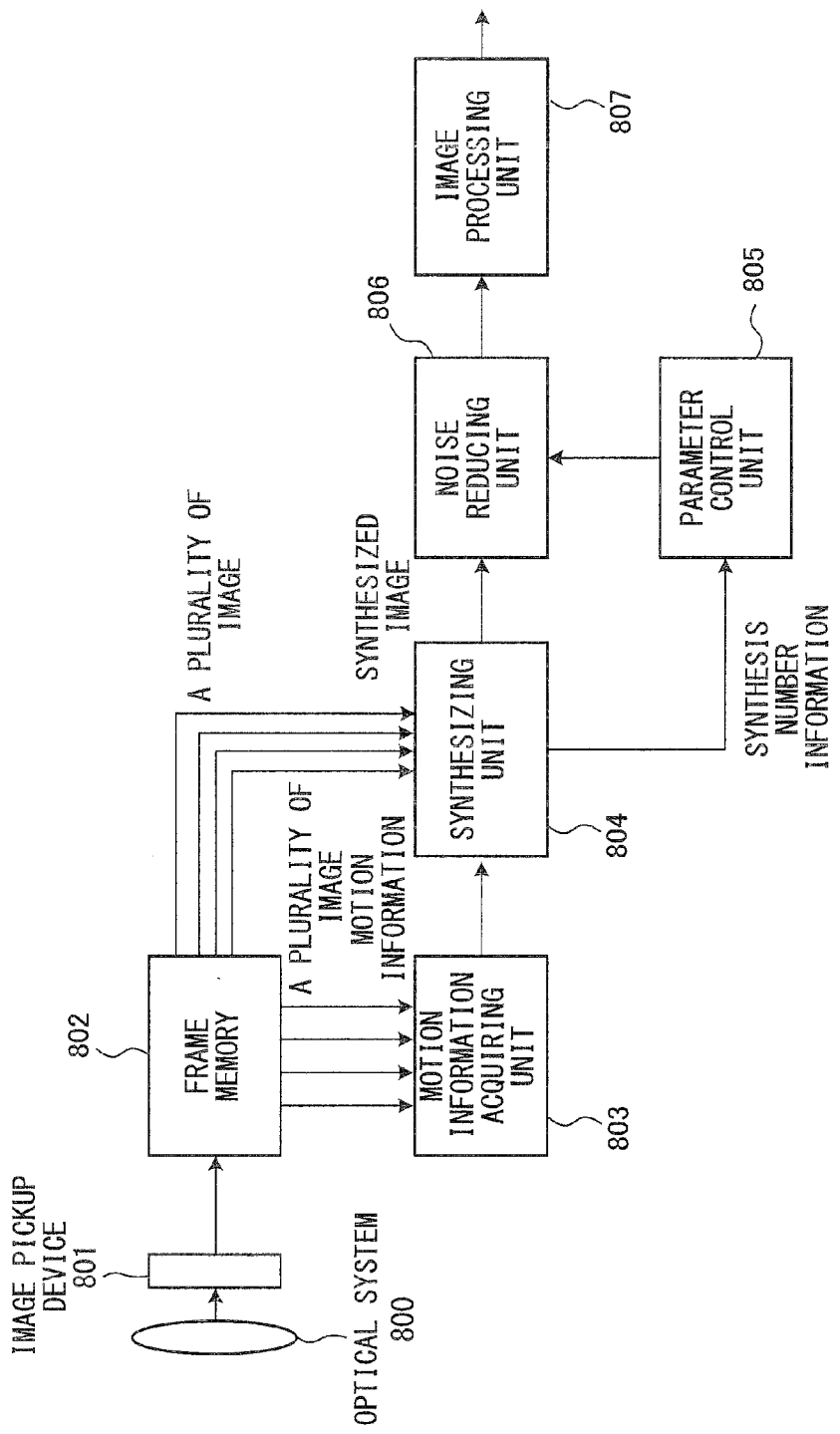
FIG. 15 is a schematic construction diagram of an image processing apparatus in a conventional example.

The second synthesizing unit 701 determines synthesis ratios from relationships shown in FIGS. 14A and 14B based on the synthesis ratio information output from the first synthesizing unit 700. FIG. 14A is a graph showing a relationship between the synthesis ratio information and a first synthesis ratio, and FIG. 14B is a graph showing a relationship between the synthesis ratio information and a second synthesis ratio. In the examples shown in FIGS. 14A and 14B, a value close to 1.0 is output as the first synthesis ratio and a value close to 0.0 is output as the second synthesis ratio at a pixel where the synthesis ratio information is small so that a synthesis ratio of an output image output from a first noise reducing unit 105 is relatively higher.

On the other hand, at a pixel where the synthesis ratio information is large, a value close to 1.0 is output as the second synthesis ratio and a value close to 0.0 is output as the first synthesis ratio so that a synthesis ratio of an output image output from a second noise reducing unit 105' is relatively higher.

Effects of the fourth embodiment of the present invention are described.

Since the first synthesizing unit 700 outputs a cumulative value of the weights of a plurality of images excluding a reference image as synthesis ratio information in this embodiment, the construction shown in the first embodiment can be applied also in the case of adopting the method for adjusting weighted average weights for the pixel selection process.

Although the cumulative value of the weights of the plurality of images excluding the reference image is the synthesis ratio information in this embodiment, the weight of the reference image may be the synthesis ratio information. In this case, similar effects can be obtained by horizontally flipping the graphs of FIGS. 14A, 14B to appropriately set them.

This embodiment is also applicable to the second or third embodiment.

Although a hardware process is assumed as the process performed by the image processing apparatus in the description of the above embodiments, limitation to such a construction is not necessary. For example, the process may be alternatively performed by software.

In this case, the image processing apparatus includes a CPU, a main storage device such as a RAM and a non-temporary computer-readable storage medium storing a program for realizing the entirety or part of the above process. Here, this program is called an image processing program. The CPU reads the image processing program stored in the above storage medium and performs information processing/arithmetic processing, thereby realizing a process similar to that of the above image pickup device.

Here, the non-temporary computer-readable storage medium is a magnetic disc, a magneto-optical disc, a CD-ROM, a DVD-ROM, a semiconductor memory or the like. Further, this image processing program may be delivered to a computer via a communication line and the computer having received this delivery may implement the image processing program.

The present invention is not limited to the above embodiments and it goes without saying that various changes and improvements, which can be made without departing from the scope of the technical concept of the present invention, are included.

The present application claims a priority based on Japanese Patent Application No. 2010-210959 filed with the Japanese Patent Office on Sep. 21, 2010, all the contents of which are hereby incorporated by reference.

What is claimed is:

1. An image processing apparatus for synthesizing an image from a plurality of images, comprising:
    a first synthesizing unit that determines one out of a plurality of images as a reference image, determines a first synthesis ratio based on correlation amounts between the reference image and the plurality of images excluding the reference image and synthesizes a first image from the plurality of images based on the first synthesis ratio;
    a noise reducing unit that reduces noise of at least the first image using a plurality of parameters and generates a plurality of noise-reduced images including at least a noise-reduced first image obtained as a result of reducing noise of the first image; and
    a second synthesizing unit that determines a second synthesis ratio according to the first synthesis ratio and synthesizes a second image from the plurality of noise-reduced images based on the second synthesis ratio.

2. The image processing apparatus according to claim 1, wherein:
    the noise reducing unit comprises:
    a reference image noise reducing unit that reduces noise of the reference image using the first parameter and generates a noise-reduced reference image, and
    a first image noise reducing unit that reduces noise of the first image using a second parameter having lower noise reduction strength than the first parameter and generates the noise-reduced first image;
    the second synthesis ratio is a synthesis ratio of the noise-reduced reference image and the noise-reduced first image; and
    the second synthesizing unit determines the second synthesis ratio according to the first synthesis ratio and synthesizes the second image from the noise-reduced reference image and the noise-reduced first image based on the second synthesis ratio.

3. The image processing apparatus according to claim 2, wherein the second synthesizing unit determines the second synthesis ratio so that a ratio of the noise-reduced reference image increases as a ratio of the reference image in the first synthesis ratio increases.

4. The image processing apparatus according to claim 1, wherein:
    the noise reducing unit comprises a first image noise reducing unit that reduces noise of the first image using N (N is a natural number equal to or greater than 2) parameters and generates N noise-reduced first images;
    the second synthesis ratio is a synthesis ratio in the N noise-reduced first images; and
    the second synthesizing unit determines the second synthesis ratio according to the first synthesis ratio and further synthesizes the second image based on the second synthesis ratio.

5. The image processing apparatus according to claim 1, wherein:
    the noise reducing unit comprises:
    a reference image noise reducing unit that reduces noise of the reference image using the first parameter and generates a noise-reduced reference image, and
    a first image noise reducing unit that reduces noise of the first image using N (N is a natural number equal to or greater than 2) parameters each having noise reduction strength lower than the first parameter and generates N noise-reduced first images;
    the second synthesis ratio is a synthesis ratio of the noise-reduced reference image and the N noise-reduced first images; and
    the second synthesizing unit determines the second synthesis ratio according to the first synthesis ratio and synthesizes the second image from the noise-reduced reference image and the N noise-reduced first images based on the second synthesis ratio.

6. The image processing apparatus according to claim 5, wherein the second synthesizing unit determines the second synthesis ratio so that a ratio of the noise-reduced reference image increases as a ratio of the reference image in the first synthesis ratio increases.

7. The image processing apparatus according to claim 1, wherein the first synthesizing unit weights the plurality of images and determines a cumulative value of the weights of the plurality of images excluding the reference image as synthesis ratio information.

8. The image processing apparatus according to claim 1, wherein the first synthesizing unit weights the plurality of images and determines the weight of the reference image out of the plurality of images as synthesis ratio information.

9. A computer-readable storage device storing an image processing program for processing picked-up images by a computer, the image processing program causing the computer to perform:
    a first synthesizing procedure for determining one out of a plurality of images as a reference image, determining a first synthesis ratio based on correlation amounts between the reference image and the plurality of images excluding the reference image and synthesizing a first image from the plurality of images based on the first synthesis ratio;
    a noise reducing procedure for reducing noise of at least the first image using a plurality of parameters and generating a plurality of noise-reduced images including at least a noise-reduced first image obtained as a result of reducing noise of the first image; and
    a second synthesizing procedure for determining a second synthesis ratio according to the first synthesis ratio and synthesizing a second image from the plurality of noise-reduced images based on the second synthesis ratio.

* * * * *